United States Patent [19]

Vick

[11] 4,450,870

[45] May 29, 1984

[54] LIQUID SPRING ACCUMULATOR WITH SELF-CHARGING MEANS

[75] Inventor: Ralph L. Vick, Granada Hills, Calif.

[73] Assignee: The Bendix Corporation, Southfield, Mich.

[21] Appl. No.: 357,968

[22] Filed: Mar. 15, 1982

[51] Int. Cl.³ .............................................. F16L 55/04

[52] U.S. Cl. ...................................................... 138/31

[58] Field of Search .............................. 138/26, 30, 31

[56] References Cited

U.S. PATENT DOCUMENTS

| | | | |
|---|---|---|---|
| 2,546,055 | 3/1951 | Ballard | 138/31 |
| 2,943,642 | 7/1960 | Westcott | 138/31 |
| 3,348,579 | 10/1967 | Swift et al. | 138/31 |
| 3,907,001 | 9/1975 | Vanderlaan et al. | 138/31 |

*Primary Examiner*—James E. Bryant, III
*Attorney, Agent, or Firm*—Robert C. Smith; W. F. Thornton

[57] ABSTRACT

A liquid spring accumulator includes a housing having inlet and outlet ports connected to a source of liquid under pressure. The housing contains a high pressure chamber and a cylindrical chamber containing a spring-loaded piston. A rod attached to the piston is movable therewith into the high pressure chamber. A passageway through the axis of the piston and rod provides communication between the inlet port and the high pressure chamber and includes a valve seat. A check valve member in the passageway includes a shaft holding the movable member off its seat during initial flow of hydraulic liquid into cylinder, permitting flow to fill the high pressure chamber. As the liquid pressure increases, the initial movement of the piston permits the check valve to close, and still further increases in pressure cause the piston to force the rod into the high pressure chamber, substantially increasing its hydraulic pressure.

5 Claims, 3 Drawing Figures

FIG. 2
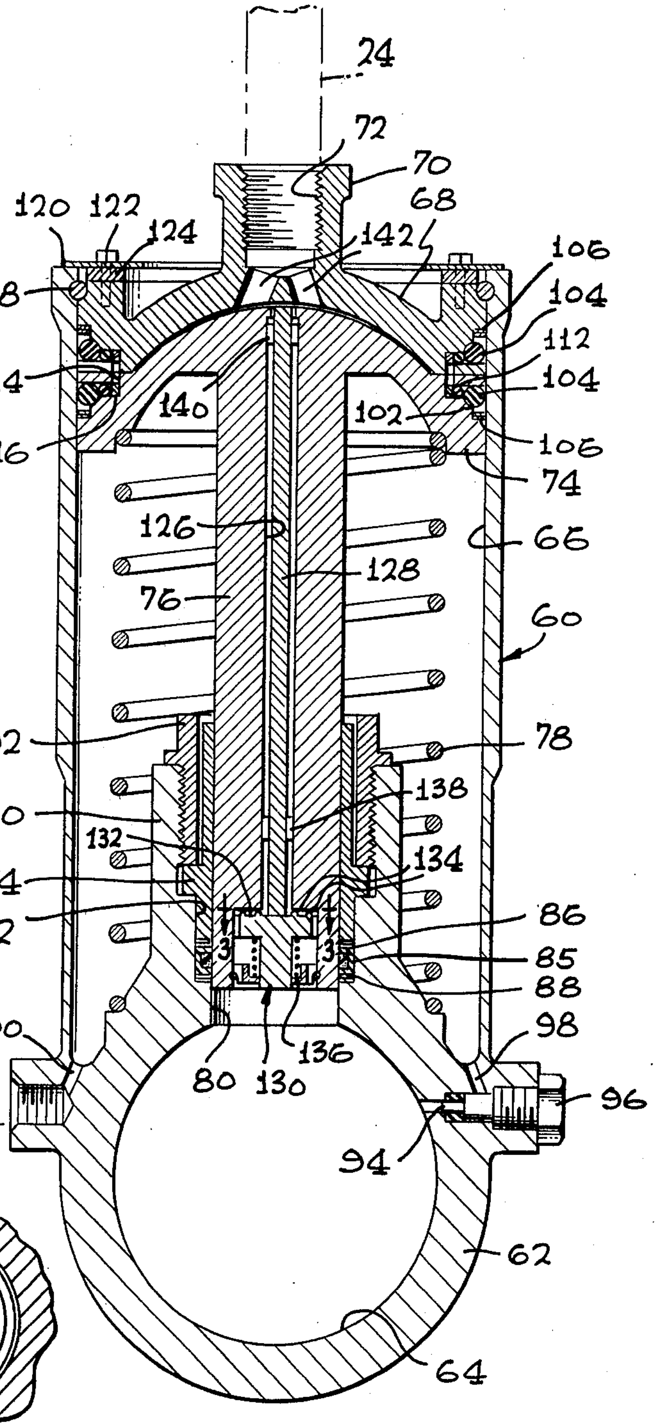
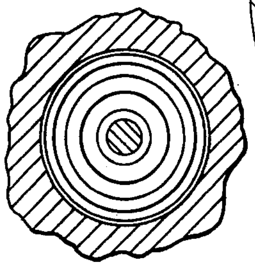
FIG. 3

LIQUID SPRING ACCUMULATOR WITH SELF-CHARGING MEANS

This invention relates to a liquid spring accumulator with self-charging means.

A liquid spring accumulator includes a high strength housing having inlet and return ports communicating with a source of liquid under high pressure and incorporating a high pressure chamber and a cylindrical chamber containing a piston communicating on one side with said source of liquid under high pressure and on its other side with the return side of said source and with a resilient member which urges the piston toward said inlet port. A rod of substantially smaller area than said piston and attached thereto communicates with the high pressure chamber such that when said piston is exposed to said high pressure liquid, the piston forces the rod into the volume of liquid in the high pressure chamber to effect a substantial pressure increase in said high pressure chamber.

Accumulators of various types have been commonly used in pneumatic and hydraulic control actuation systems to suppress pressure surges or to supply energy during peaks of demand when the fluid pressure requirements may be greater than the pressure source can deliver. Probably the greatest number of accumulators in use are pneumatic rather than liquid, and such pneumatic accumulators tend to be somewhat lighter in weight than liquid accumulators. With increasing operating pressures and increased requirements for reliability, it has begun to appear that, as compared with a pneumatic accumulator, a liquid spring accumulator has several advantages with relatively little sacrifice in weight and space requirements. The primary benefits are related to elimination of the gas charge, i.e., no system degradation because of gas leakage and no service required. As compared with gas or pneumatic-type accumulators, reliability is enhanced because:

(1) there are no high pressure gas lines that require continual servicing with special maintenance equipment, (2) there is no depletion of the gas charge externally, which requires extra fluid reservoir volume to compensate, and (3) there is no depletion of the gas charge internally, which results in low spring rate unstable operation.

Since the regular hydraulic actuating liquid is used in the spring accumulator, any leakage goes directly into the system return chamber at return pressure and so no special fluids are required.

An additional advantage of the liquid spring accumulator as compared with a gas accumulator is that it is inherently much less vulnerable to battle damage or structural damage because of the thick walls required. Further, if the liquid spring accumulator is damaged severely, the energy entrapped in the high pressure chamber is released with much less potential damage to the surrounding structure.

Because of the very high liquid pressures created in liquid spring accumulators, special care must be taken with seals to avoid premature failure. In earlier efforts to design such accumulators, applicant succeeded in producing an operative accumulator which developed a liquid spring pressure of approximately 5000 $Kg/cm^2$, but seal failures were experienced after approximately 60 cycles. The seal problems have been successfully surmounted, and the liquid spring accumulator now appears to offer increased reliability with a reduction in overall space requirements. For specific applications these advantages more than offset a possible weight penalty. A self-charging liquid spring accumulator is defined as one which uses system hydraulic fluid compressability as the energy storage spring. Pressure generated for energy storage is achieved by an area step-down reduction from the system piston to the liquid spring pressure chamber rod; thus, ultra high pressure is developed in this chamber from the feeding of normal system pressure. The self-charging feature is incorporated by means of a check valve which opens when system pressure and return pressure are approximately equal and provides communication between system pressure and the liquid spring fluid chamber to fill the chamber. When system pressure is applied, the first pressure buildup will overcome the system piston return spring; then piston movement will close the check valve. Further pressure buildup transmits load to the closed liquid spring volume through the area ratio of the system piston to the liquid spring rod.

In the drawings

FIG. 2 is a sectional drawing of another embodiment of my liquid spring accumulator.

FIG. 3 is a sectional drawing on an enlarged scale taken along line 3—3 of FIG. 2.

Figures 1, 1A, 1B:
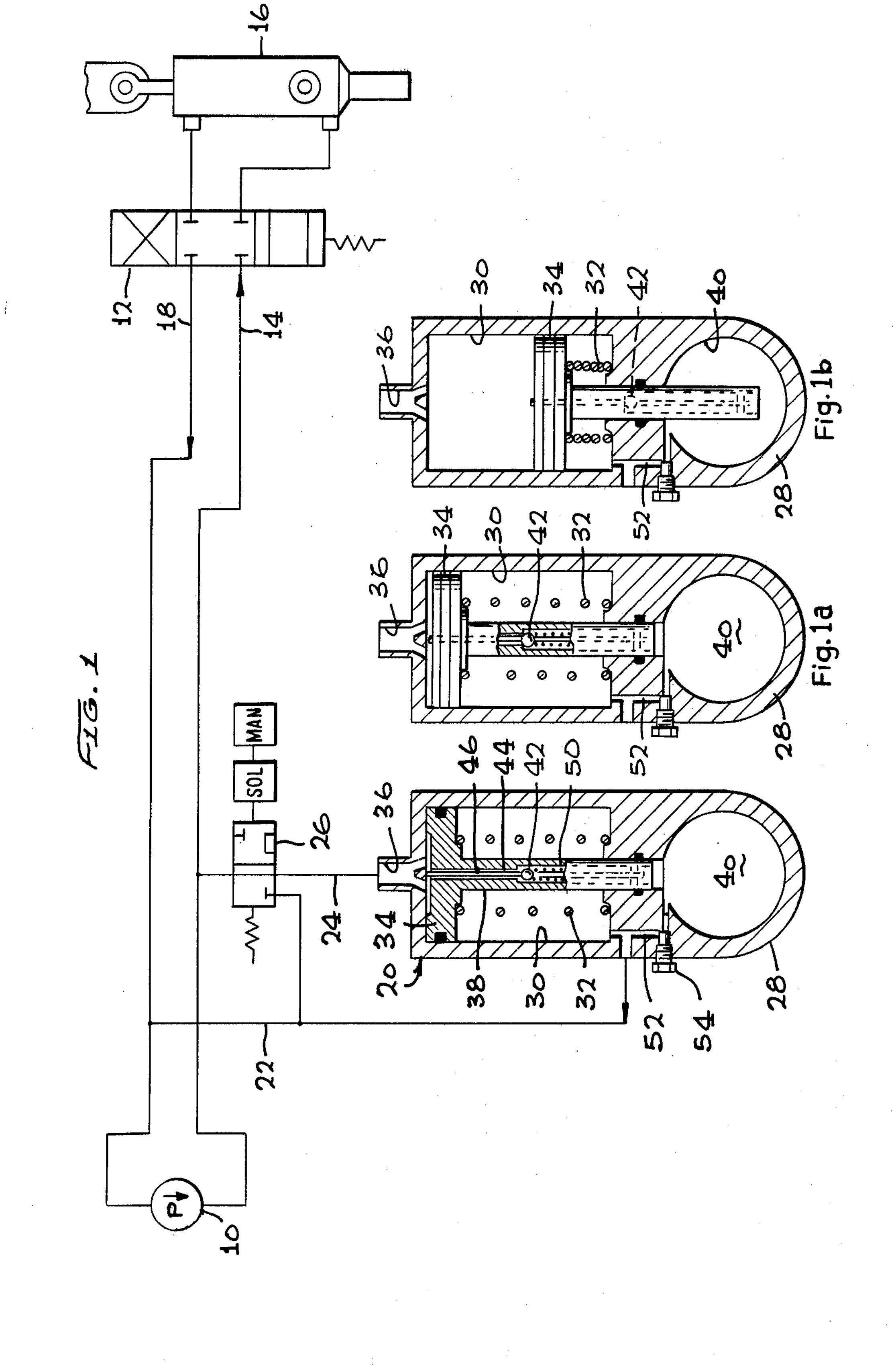
FIG. 1 is a schematic diagram of a hydraulic system for controlling a hydraulic servo actuator incorporating a liquid spring accumulator according to my invention, FIGS. *1a* and *1b* show the accumulator of FIG. 1 in different operating positions.

Referring now to the schematic of FIG. 1, a pump 10 of any suitable design is shown supplying hydraulic liquid under pressure through a control valve 12 via a line 14 to a hydraulic actuator 16. Actuator 16 consists of a conventional hydraulic cylinder with a piston therein movable to effect movement of a control surface or other member. Control valve 12 also has a connection to the return side of the pump through conduit 18. In the position of the control valve 12 shown no fluid is supplied to or from the actuator 16 which is therefore locked in position. Were the valve 12 to be moved downwardly, the high pressure would be supplied to the upper end of hydraulic cylinder 16 and the lower end would be connected to the return line. My liquid spring accumulator 20 is shown connected through lines 22 and 24 to the return and high pressure lines from pump 10 respectively. A control valve 26 is shown connected to lines 22 and 24 whose function is to provide assurance that the liquid spring accumulator 20 can be depressurized when desired. Valve 26 can be operated either manually or through a solenoid or suitable control means. The liquid spring accumulator 20 consists of a housing 28 having heavy walls and including a cylindrical chamber 30 containing a spring 32. This spring urges a piston 34 in an upward direction against the force of hydraulic pressure supplied from line 24 through an inlet port 36 to the upper side of piston 34. Attached to piston 34 is a rod 38 which extends downwardly through a channel in the housing 28, thereby communicating with a high fluid pressure chamber 40. A movable check valve member 42 is located in an elongated axial passage 44 extending through the center of piston 34 and rod 38. Member 42 includes an elongated shaft 46 which, as shown, makes contact with the upper end of housing 28, and because of this contact the valve member 42 is prevented from seating on its seat in passage 44. A light spring 50 urges check valve member 42 toward its seat. The high pressure chamber 40 is connected to return line 22 through a conduit 52 containing a bleed valve 54, shown manually operated but which could be operated through other means. Through the use of this bleed valve it is possible between operating cycles for maintenance personnel to directly connect chamber 40 with the return side of pump 10 thereby effectively removing air from this chamber to assure that it is filled with hydraulic liquid.

In the position shown in FIG. 1, high pressure from pump 10 is connected through line 24 and inlet port 36 to the upper side of piston 34. Since piston 34 is in its uppermost position, the shaft 46 attached to check valve member 42 is in contact with the end of the chamber and valve member 42 is held open. This permits high pressure fluid to be communicated through passageway 44 to the high pressure chamber 40 and permitting this high pressure chamber to be filled with fluid. FIG. 1*a* shows a subsequent position of piston 34 which, under pressure, has begun to move in a downward direction. As it does so, it carries the check valve member 42 along, and this member now seats under the influence of spring 50 because the rod 46 is no longer in contact with the end of the cylindrical chamber.

The pressure on the upper side of piston 34 will continue to build up to system pressure as supplied by the pump which might, for example, be 570 $Kg/cm^2$, and the effect of building to this pressure level is shown in FIG. 1*b* wherein it will be seen that the piston 34 is moved downwardly a substantial distance in cylindrical chamber 30 compressing spring 32 and forcing the rod 38 deeply into the high pressure chamber 40. Since the increase in pressure in chamber 40 acts through the center of rod 38 to even more firmly seat the check valve member 42, the pressure in chamber 40 is trapped and will be increased as its displacement is reduced from further intrusion of the rod 38 into chamber 40. Since the hydraulic fluid in this chamber is liquid and only somewhat compressible, the pressure will rise very considerably to a value which is controlled by the relative area ratios between the area of piston 34 and that of rod 38. In one accumulator with which applicant has been working, the maximum pressure in the high pressure chamber reached 5700 $Kg/cm^2$ with 570 $Kg/cm^2$ in cylinder 30. From the foregoing it is believed that the reader will understand the operation of my liquid spring accumulator as installed in a hydraulic circuit for an actuator or similar control device. The valve 26 shown connected in line 24 leading to the accumulator 20 is not always necessary but provides a means for reducing pressure in the accumulator when desired.

Structural details of my liquid spring accumulator will become somewhat more clearly defined from examination of the sectional drawing, FIG. 2. In this drawing an external housing is shown at numeral 60 including a spherical section 62 having heavy walls for resisting very high liquid pressures. A very high pressure spherical chamber 64 is enclosed within the walls of section 62. Housing 60 also encloses a cylindrical chamber 66 which is closed at one end by means of an end cap member 68 including a boss 70 containing an inlet passage 72 which is adapted to be threadedly engaged with a conduit such as conduit 24 (see FIG. 1) connected to the high pressure source. Movable within the cylinder 66 is a piston 74 to which is attached a rod 76. A spring 78 urges piston 74 toward the end cap member 68. Part of the wall of section 62 which is directed toward the inside housing 60 includes a cylindrical opening 80 for receiving and supporting the end of rod 76. A portion of the cylindrical passageway 80 is of expanded diameter as shown at numeral 82 and this opening combined with a member 84, which surrounds and partially supports the rod 76, together define an annular groove which receives a seal consisting of a rubber O-ring 85 covered by an annular seal 86 of polytetrafluoroethylene material and a plurality of metal and plastic backup rings 88. An additional expanded diameter collar 90 constituting an extension of section 62 which supports the rod 76 is threadedly engaged with a member 92 which, as it is turned into the inside of collar 90, compresses the seal members such that they provide a proper seal between section 62 and the end of the rod 76. This must be an unusally good seal because of the extremely high pressures within chamber 64.

Communicating with chamber 64 is a small passageway 94 which is normally closed by means of a bleed valve member 96 threadedly engaged with housing 60 and which communicates with another small passageway 98 leading to the interior of cylindrical chamber 66. Bleed valve member 96 provides a means of permitting the contents of chamber 64 to be exhausted through passageways 94 and 98, the interior of cylindrical chamber 66, and out of a port 100 which leads to the return line 22 (see FIG. 1).

It will be observed that piston 74 includes a stepped groove arrangement 102 at its periphery which contains a seal including an O-ring member 104 and a plurality of metal and plastic backup rings 106. Radially inwardly from the O-ring 104 is a small sealing ring 112 which senses system pressure tending to drive the O-ring radially outward. This ring 112 is placed adjacent another small ring 116, and each of these rings is adjacent a small annulus 114 which communicates pressure forcing ring 112 outwardly. Ring 116 serves to prevent ring 112 from blocking ports (not shown) communicating the annulus 114 with the sealing ring 104. An essentially identical sealing arrangement is used in both the end cap 68 and the piston 74. The end cap 68 is secured in the housing 60 by means of a shear ring 118 which is secured against a shoulder in the end cap 68 and within a groove in the housing 60 to prevent internal pressure acting on the inside of the end cap 68 from forcing this end cap out of the housing 60.

A small plate 120 is secured to the end cap 68 by means of a series of bolts 122 which feed through some heavy washers 124 and which are threadedly engaged with the end cap 68. Since end plate 120 extends over the ends of the housing 60, the arrangement described will prevent end cap 68 from moving inwardly as a result of any unusual low pressures in the interior of cylindrical chamber 66 or from external forces.

A small diameter passageway 126 is drilled through the central axis of piston 74 and rod 76, and this passageway contains a shaft 128 fastened to a check valve member 130. At the inside end of passageway 126 nearest the high pressure chamber 64 this passage is expanded to include a valve seat area 132 which is circular and formed at right angles to the axis of the shaft 128. The check valve member 130 has a flat circular face opposing seat 132 and includes a plurality of annular rings 134 which make contact against seat 132. A light spring 136 tends to urge check valve member 130 against the seat 132. To assure proper alignment of the check valve member 130 with the seat 132, shaft 128 is secured in annular support members 138 and 140 which freely permit the passage of liquid therethrough.

The liquid spring accumulator of FIG. 2, although slightly different in configuration from that described above, operates in almost exactly the same manner. Hydraulic oil supplied under initial pressure to inlet port 72 will pass through a plurality of passages 142 to the adjacent surface of piston 74 and will also flow through the passageway 126 and past check valve member 130 into chamber 64. Check valve 130 is held open because the shaft 128 is in direct contact with the end cap member 68. Further increases in fluid pressure applied to the upper end of piston 74 will cause the piston to move downwardly against the force of spring 78, carrying the shaft 128 away from its contact with end cap 68 and permitting the check valve member 130 to close against seat 132. With a further buildup of pressure, piston 74 and rod 76 will continue to move downwardly, forcing rod 76 into chamber 64 where a comparatively small displacement of the rod will result in rapid increases in the fluid pressure. This pressure will increase until a stability is reached wherein the system pressure operating on the area of piston 74 equals the pressure in housing 64 acting on the smaller area of rod 76. With an area ratio between the piston and rod of approximately 10 to 1, the resulting liquid pressure in housing 64 will approach a value 10 times that of the system pressure. This pressure is then available in the system to supply energy during peaks of demand as required or to absorb pressure surges.

When the hydraulic system is shut down, it is considered desirable to remove the pressure from the high pressure chamber. This can be done automatically by reducing system pressure to return pressure and allowing spring 78 to drive the piston 74 to the right and to force open check valve 132 or through operation of the bleed valve 96 which can be manually turned to provide communication between passages 94 and 98 to thereby permit the pressure in chamber 64 to be exhausted through the conduits 94 and 98, chamber 66, return port 100 and return pressure line 22. It is considered advantageous to remove the pressure from the accumulator at the end of each duty cycle and refill and repressurize at the beginning of the next cycle, primarily because some leakage is practically inevitable with the pressures encountered, and retaining the accumulator in a pressurized condition between cycles will result in initiating subsequent cycles with lower pressures because of such leakage.

I claim:

1. A liquid spring accumulator with self-charging means including a high strength housing having inlet and return ports communicating with a source of operating liquid under high pressure, a high pressure chamber communicating with said source, a cylindrical chamber in said housing, a piston movable in said cylindrical chamber having one side communicating with said inlet port, resilient means urging said piston toward said inlet port and a rod in said cylindrical chamber of substantially smaller area than said piston attached to said piston and axially movable therewith into said pressure chamber;

characterized in that said accumulator includes an axial passage through said piston and rod connecting said inlet port with said high pressure chamber, a check valve in said passage, means holding said check valve open when said piston is nearest said inlet port, and a spring urging said check valve toward a closing direction, such that when said operating liquid is first supplied to said housing, said check valve permits said high pressure chamber to be filled, and when said operating liquid pressure reaches a predetermined level above the pressure at said return port, said piston initially moves to cause said check valve to be closed and further increases in said operating liquid pressure acting against said piston force said piston to carry said rod into said high pressure chamber.

2. A liquid spring accumulator as claimed in claim 1 wherein said check valve includes a seat in said axial passage, a movable valve member urged against said seat by said spring, and said means holding said check valve open includes a shaft attached to said movable valve member and passing through said axial passage to make contact with the end of said cylindrical chamber when said piston is nearest said inlet passage.

3. A liquid spring accumulator as claimed in claim 2 including conduit means communicating said high pressure chamber with said return port said conduit means including the part of said cylindrical chamber containing said resilient means and a bleed valve in said conduit means between said high pressure chamber and cylindrical chamber.

4. A liquid spring accumulator as claimed in claim 1 wherein said axial passage includes a larger diameter section with a flat circular seat surface normal to the axis of said passage extending between the smaller and larger diameter portions of said passage and said check valve includes a flat sealing face with concentric ring projections adapted to seal against said seat surface.

5. A liquid spring accumulator as claimed in claim 1 wherein said housing includes support means including a cylindrical passageway for supporting and guiding the end of said rod nearest said high pressure chamber, a groove adjacent said cylindrical passageway, and a seal is located in said groove between said support means and said rod, said seal including an O-ring of elastomeric material, a cap ring of polytetrafluoroethylene material and a plurality of annular metal and plastic rings.

* * * * *